US005915154A

United States Patent [19]

Schoch et al.

[11] Patent Number: 5,915,154

[45] Date of Patent: Jun. 22, 1999

[54] APPARATUS FOR CONVEYING TONER MATERIAL FROM A RESERVOIR

[75] Inventors: Bernd Schoch; Edmund Creutzmann, both of Markt Schwaben; Robert Lang, Eching, all of Germany

[73] Assignee: Océ Printing Systems GmbH, Poing, Germany

[21] Appl. No.: 08/993,583

[22] Filed: Dec. 18, 1997

[30] Foreign Application Priority Data

Dec. 18, 1996 [DE] Germany ........................... 196 52 860

[51] Int. Cl.[6] .......................... G03G 15/08; B65G 69/06; A62C 5/00

[52] U.S. Cl. .................... 399/258; 222/195; 222/DIG. 1; 239/311

[58] Field of Search ..................................... 399/258, 259, 399/260, 261, 262, 252, 222; 222/DIG. 1, 195, 630; 239/310, 311, 318

[56] References Cited

U.S. PATENT DOCUMENTS 3,826,540 7/1974 Jensen ................................. 222/195 X
4,945,956 8/1990 Bueyuekgueclue et al. ....... 399/258 X
4,990,964 2/1991 Kraehn .................................... 399/261
5,521,690 5/1996 Taffler et al. ................. 222/DIG. 1 X

FOREIGN PATENT DOCUMENTS 35 46 231 7/1987 Germany .
36 33 599 4/1988 Germany .
61-151675 10/1986 Japan .

OTHER PUBLICATIONS

Japanese Abstract, Toner Replenishing Device, 61–59464, Mar. 26, 1986.

*Primary Examiner*—Arthur T. Grimley
*Assistant Examiner*—Hoan Tran
*Attorney, Agent, or Firm*—Hill & Simpson

[57] ABSTRACT

The apparatus for conveying finely powdered material from a reservoir includes a suction/pressure unit that projects into the reservoir. A gas is introduced into the suction/pressure unit and is mixed with the finely powdered material that is sucked into suction/pressure unit from the reservoir to form a powder/gas mixture and this mixture is discharged. Compressed air blows into the reservoir in a finely dispersed manner to fluidized the finely powdered material so that the extraction of the finely powdered material from the reservoir is facilitated.

6 Claims, 3 Drawing Sheets

APPARATUS FOR CONVEYING TONER MATERIAL FROM A RESERVOIR

BACKGROUND OF THE INVENTION

1. Field of the Invention

The present invention is directed generally to an apparatus for conveying finely powdered toner material from a reservoir and, in particular, to an apparatus for conveying toner in a printer or copier.

2. Description of the Related Art

In printers or copiers that electrophotographically apply toner to a carrier material, the toner is stored in a reservoir and is supplied to a developer station of the printer or copier by a conveyor apparatus. For example, an underpressure or suction is generated, which is used to suction the toner from the reservoir and move it to the developer station. A toner/air mixer is generated which is conveyed through channels, tubes, and hoses by the underpressure to a separator in which the air is separated from the toner/air mixture to supply the toner to the developer station. Blockages in the channels, tubes and hoses often occur in such underpressure systems. Although the probability of a blockage is reduced by increasing the velocity of the toner/air mixture through the channels, tubes and hoses, this causes mechanical and electrostatic changes to occur in the toner, which much be accepted as a tradeoff.

Mechanical conveyor systems are also known in which a conveyor worm screw or paddles are used to move the toner. Such mechanical systems are effective for conveying the toner only over short conveying distances and with limited dependability. Moreover, the toner is damaged by the friction and compression imposed on the toner of such mechanical conveyors. To empty the reservoir as completely as possible without leaving toner residue behind, mechanical shakers or beaters are utilized; however, these compress the toner and make it more difficult to convey the toner by underpressure, for example. The shaking and beating of the toner container also causes physical changes or damage to the toner.

In Japanese Patent Document JP 61-151675 A and the corresponding English abstract in Patent Abstracts of Japan, P-521, 1986, Vol. 10, No. 354, is disclosed a means for conveying toner in which gas flows under pressure along a conduit. A suction channel that projects into the reservoir for the toner branches off from the conduit. Toner material mixed with the gas is extracted through the suction channel.

In the publication patent abstracts of Japan P 483, 1986, Vol. 10, No. 223, which is the abstract of Japanese Patent Document JP 61-59 464 A, is disclosed a toner delivery means wherein a part of the conveyed toner/gas mixture is branched off and then returned into the toner reservoir. The branching of the toner/gas mixture is intended to promote suction efficiency. Nothing in this document teaches to provide a fluidizing unit which fluidizes the toner in the immediate proximity of the end of the suction pipe.

German Patent Document DE 36 33 599 A1 discloses a means for filling toner from a transport container into a toner reservoir. The air flows around the end of an ascending pipe as disclosed in an exemplary embodiment shown in FIG. 3 of the reference. To keep the toner in an easily conveyed condition, a shaker is provided in the proximity of the end of the ascending pipe, the shaker shakes the toner so that it is conveyed through a toner sieve through intake openings and then proceeds into the ascending pipe through openings in the pipe. Nowhere is it shown in this reference that a fluidizing unit is provided which places the toner in a fluid-like condition.

German Patent Document DE 35 46 231 A1 discloses a powder spray gun for an electrostatic powder coating. The spray gun works according to the Venturi effect, where a gas stream in a suction channel generates an underpressure, or suction, that conveys the powder into the main gas stream, where it is mixed with the gas.

SUMMARY OF THE INVENTION

An object of the present invention is to convey toner powder from a reservoir with little mechanical and electrostatic modification of the toner and to enable a blockage-free conveyance of the toner powder.

This and other objects and advantages of the invention are provided by a means for conveying toner, such as toner for a printer or a copier, from a reservoir including a suction/pressure unit with an overpressure input, an overpressure outlet, and an underpressure connection to which a suction channel that projects into the reservoir is connected. A gas at an elevated pressure is introduced through the overpressure input and the introduced pressurized gas is mixed in the suction/pressure unit with finely powdered toner material that is suctioned into the suction/pressure unit from the reservoir to form a powder/gas mixture. The mixture is delivered through an overpressured delivery line which is connected to the overpressure outlet. The invention is characterized by the reservoir being provided with a fluidizing unit with which the toner is fluidized in the proximity of the end of the suction channel.

Due to the suctioning of the toner from the reservoir, minimal mechanical and electrostatic modification of the toner particles occurs. In the suction/pressure unit, the toner particles which are extracted from the reservoir by the suction/pressure unit are mixed with the gas which has been introduced into the particles to form a powder/gas mixture. The mixture is discharged into channels, tubes and hoses through an overpressure discharge conduit. Should a blockage occur in the channels, tubes or hoses in which the toner is being transported, a higher dynamic pressure builds up behind the blockage which presses against the blockage and ultimately eliminates it.

According to the invention, the toner reservoir includes a fluidizing unit with which the powder is fluidized in the proximity of the second, or lower, end of the suction channel. The extraction of the toner from the reservoir with the suction/pressure unit is facilitated by the fluidization of the toner in the reservoir. The fluidization is effected in that the air is mixed with the toner powder, for example, at a ratio of 9:1. The toner/air mixture behaves like a liquid with a low specific gravity and can be easily extracted from the reservoir. Preferably, the fluidizing unit is attached to the second end, or lower end, of the suction channel which projects into the reservoir. The fluidizing unit contains at least one fluidizing element projecting into the reservoir with which the gas, in particular compressed air, is supplied so that it is finely distributed in the interior of the reservoir. This provides an especially good blending or mixing of the toner particles with the air and an intense fluidization of the toner in the region of the fluidization unit. The reservoir can be completely emptied more easily and there is no need to have recourse to mechanical shakers or beaters to empty the toner residue from the reservoir, so that with the present invention the toner is not deteriorated in its mechanical or electrostatic properties.

In another preferred embodiment, the fluidizing element projects into the reservoir and includes a hollow space connected to an overpressure gas source, the hollow space being surrounded by a porous wall so that the interior of the reservoir is supplied with compressed air through the pores of the porous wall. The diameter of the pores is preferably smaller than the diameter of the toner particles so that the pores are not blocked by the toner. This arrangement enables an optimized fluidization of the toner powder and also prevents toner particles from entering into the fluidizing element in case a low pressure should arise in the hollow space.

Preferably, the fluidizing element is provided with compressed air for fluidizing the toner powder through one or more separate overpressure delivery lines.

It is particularly advantageous when the fluidizing element is provided with compressed air for fluidizing the toner powder through a second overpressure delivery line which is branched off from the first overpressure delivery line that supplies the pressurized gas to the overpressure input of the suction/pressure limit. As a result, the manufacturing outlay for the present apparatus is reduced and the apparatus is also made more compact.

And yet a further development of the present invention, the suction/pressure unit has a channel-like section between the overpressure input and the overpressure outlet. This channel-like section has a longitudinal axis extending generally along the flow direction of the compressed air from the overpressure input to the overpressure outlet along which a nozzle projects from the overpressure input into the middle of the channel-like section. The nozzle is directed toward the overpressure outlet, and the channel-like section has a constriction perpendicular to the longitudinal axis. The first end of the suction channel discharges into the channel-like section in a region which is located upstream of the constriction relative to the flow direction of the compressed air. Thus, the suction/pressure unit forms a suction/pressure injector which works according to the Venturi principle, thereby providing a Venturi nozzle. An underpressure with which the toner particles are suctioned out of the reservoir into the suction/pressure unit through the suction channel thereby arises in the area of the constriction.

Yet a further development of the invention provides that the overpressure discharge line is connected to a distributor system which includes a plurality of compressed air conduits placed in parallel to one another along which the toner powder/compressed air mixture is transported. The distributor system preferably includes at least one controllable shunt and a branch with which the toner powder/compressed air mixture is controllably supplied through the distributor system to a destination point such as, for example, an air separator which precedes a developer station. This has the advantage that the compressed air has to be supplied to the suction/pressure unit through only one overpressure input and there is no need for the underpressure to be supplied at various destination points, as in the case of the underpressure conveying apparatus of the prior art. Specifically, this means that only connection is required for the section/pressure unit instead of number of underpressure connections at individual air separators.

BRIEF DESCRIPTION OF THE DRAWINGS

Further advantages, features and possible applications of the invention may be derived from the following description of the preferred exemplary embodiments with reference to the drawings.

DETAILED DESCRIPTION OF THE PREFERRED EMBODIMENTS

Figure 1:
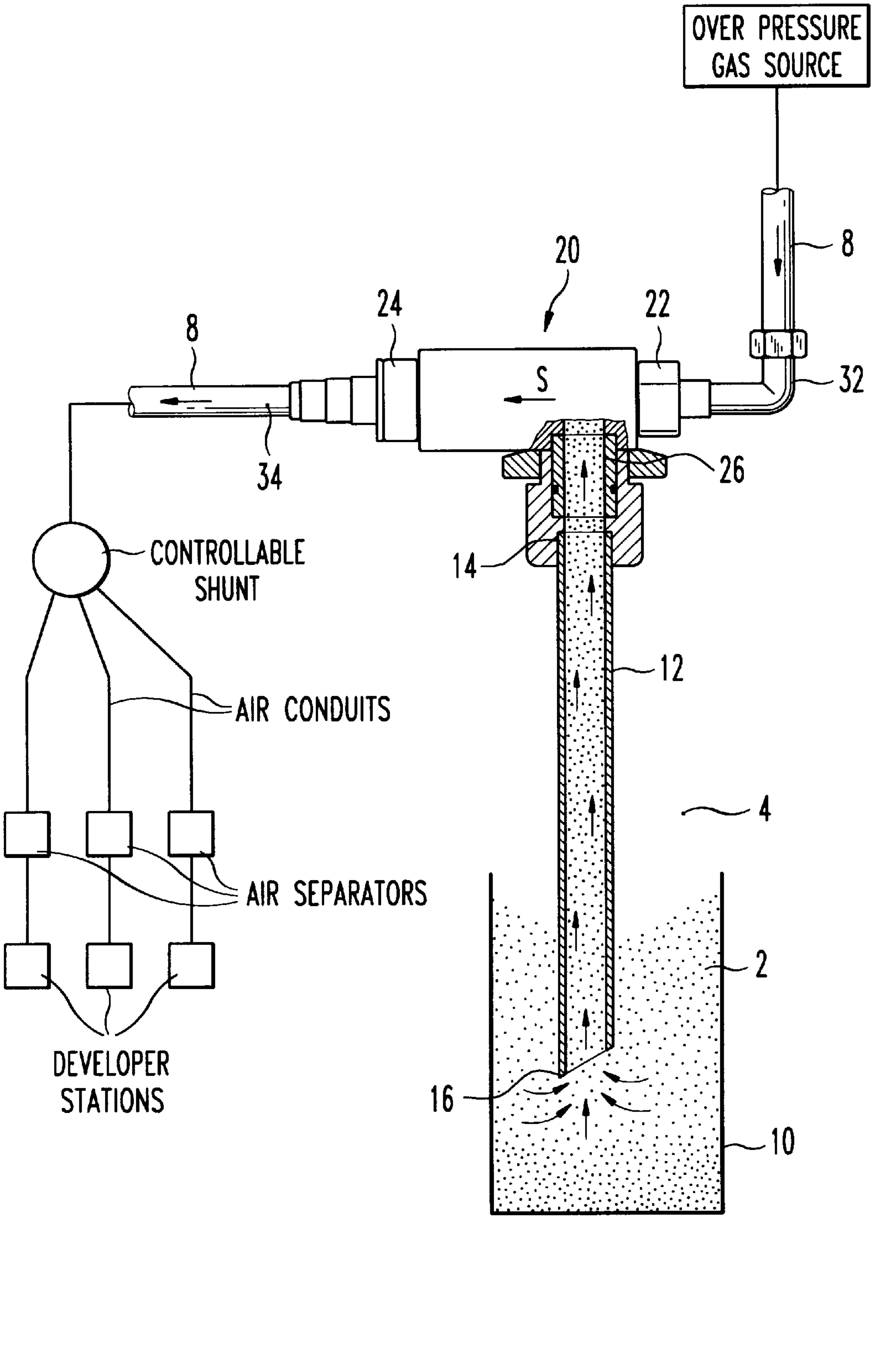
FIG. 1 is a side view of a first exemplary embodiment of the apparatus of the invention, shown partially in section.

FIG. 1 shows a first exemplary embodiment of the invention. The present apparatus is provided in a printer or a copier and includes a suction/pressure injector with an overpressure, or high pressure, input 22, an overpressure outlet 24 as well as an underpressure connection 26. A first overpressure supply line 32 is provided to the overpressure input 22 of the suction/pressure injector 20. The overpressure supply line 32 is connected from an overpressure gas supply. An overpressure delivery line 34 is connected to the overpressure outlet 24 of the suction/pressure injector 20. A suction channel 12 has its first end 14 connected to the underpressure connection 26 of the suction/pressure injector 20. The second end, or lower end, 16 of the suction channel 12 projects into a reservoir 10 which is filled with finely powdered toner particles 2. The reservoir 10 is in communication with the ambient air 4, which is at a normal pressure.

The suction/pressure injector 20 uses the suction effect of a Venturi nozzle, (as shown in more detail in FIG. 3) and is operated by providing compressed air, or overpressure air, supplied through the first overpressure supply line 32 which flows through the suction/pressure injector 20 along the flow direction S and leaves the suction/pressure injector 20 through the overpressure delivery line 34. As a result, an underpressure, or suction, which serves the purpose of suctioning toner particles to out of the reservoir 10 arises at the underpressure connection 26 of the suction/pressure injector 20. The toner particles which are suctioned into the suction/pressure injector 20 mix with the compressed air that is supplied through the first overpressure supply line 32 and yields a toner/compressed air mixture at the overpressure outlet 24, which is then conducted to a distributor system for the printer or copier through the overpressure delivery line 34. The distributor system supplies the toner/compressed air mixture to, for example, one or more air separators which each precede a developer station for the printer or copier. The distributor system has several branches connected through a controllable shunt to switch the toner/air mixture as needed. The air separators remove the toner from air and provides it to the developer station which develops the image for printing.

Figure 2:
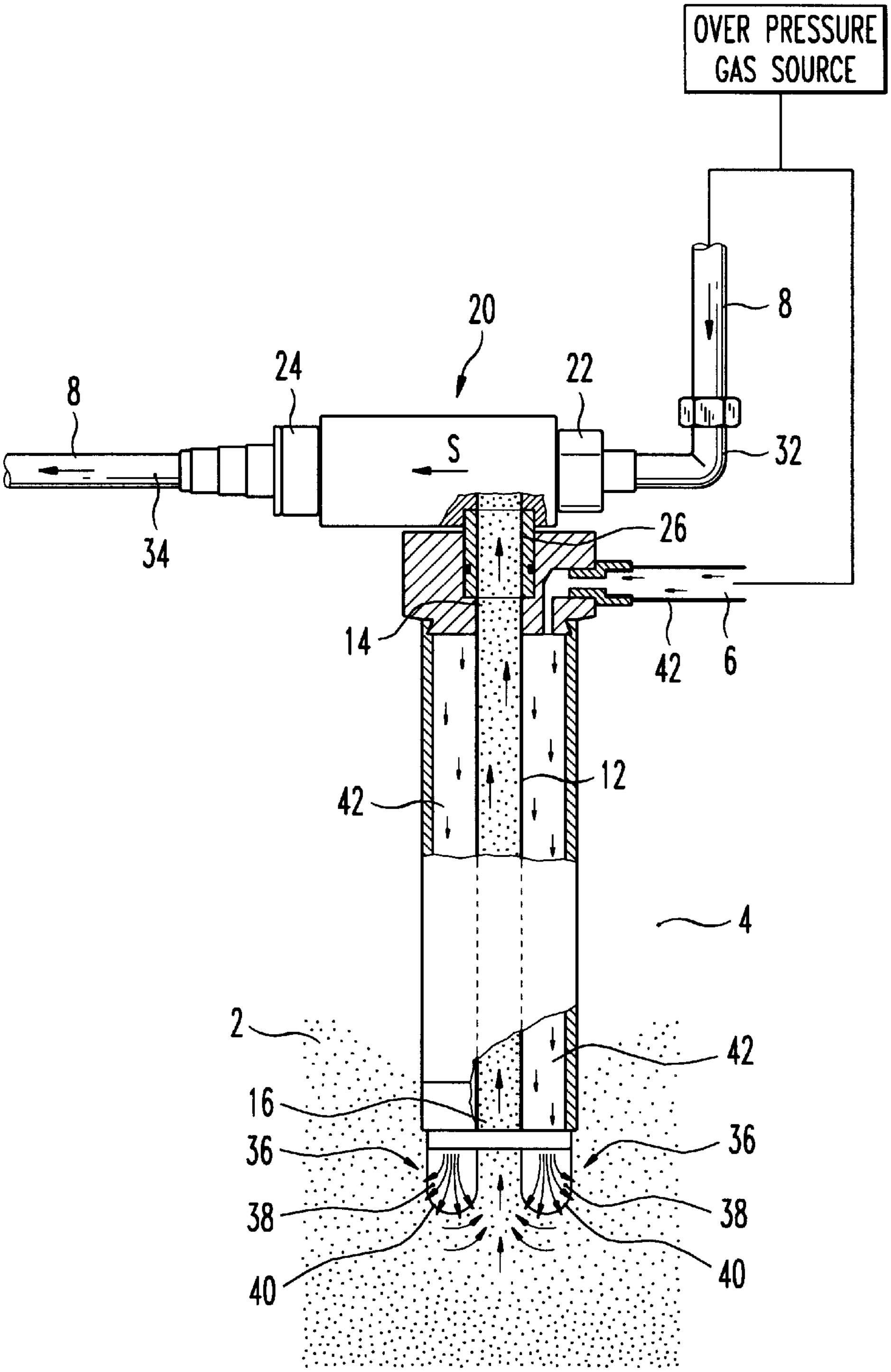
FIG. 2 is a side view of a second exemplary embodiment according to the invention, shown partially in section.

In FIG. 2 is shown a further exemplary embodiment of the present invention. In the figure is shown essentially the same components as in the embodiment of FIG. 1, namely the suction/pressure injector 20 with an overpressure input 22, an overpressure outlet 24 as well as an underpressure connection 26 which is connected to the first overpressure supply line 22, the overpressure delivery line 34 and the first end 14 of the suction channel 12, respectively. The exemplary embodiment of FIG. 2 also includes a fluidizing unit that comprises a fluidizing element 36 and a second overpressure supply line 42. The second overpressure supply line 42 is connected to the overpressure gas supply and may be branched off the first overpressure supply line 32. The fluidizing element 36 is at the second end, or lower end, of the suction channel 12 in the reservoir 10 which holds the toner 2. The fluidizing element 36 is formed of a porous wall 40 which is in the shape of a fingertip and which surrounds a hollow space 38 that is in communication with the second overpressure supply line 42.

The second overpressure supply line 42 has a portion of an annular shaped crossection that is positioned concentrically about the suction channel 12. At least one fluidizing element 36 is secured at the lower end 16 of the pipe which is formed of the suction channel 12 and the second overpressure supply line 42. The fluidizing element 36 in one embodiment is the form of a fluidizing taper that is screwed into the lower end 16. This enables an easy changing of the fluidizing element 36 for the purpose of cleaning or replacing it.

During operation, the fluidizing element 36 is supplied with compressed air 6 through the second overpressure supply line 42, the compressed air 6 being blown into the reservoir 10 in the area filled with toner powder 2 through at least one fluidizing unit 36 so that the air is finely distributed by the porous wall 40 of the fluidizing unit 36. As a result, a blending or mixing of the toner particles 2 with the air occurs in the immediate proximity of the lower end 16 of the suction channel 12, this mixing being referred to as fluidizing. In one example, the fluidized toner/compressed air mixture has a volume ratio of toner to compressed air of approximately 1:10. This ratio and, thus, the extent of fluidization is influenced by the pressure of the compressed air 6 in the second overpressure supply line 42. The suction power of the suction/pressure injector 20 required for extracting the toner from the reservoir 10 is considerably reduced by the fluidization of the toner particles 2. When the lower end 16 of the suction channel 12 is located at the lowest point of the toner reservoir 10, then a complete removal of the toner from the reservoir is enabled by fluidizing the toner.

Figure 3:
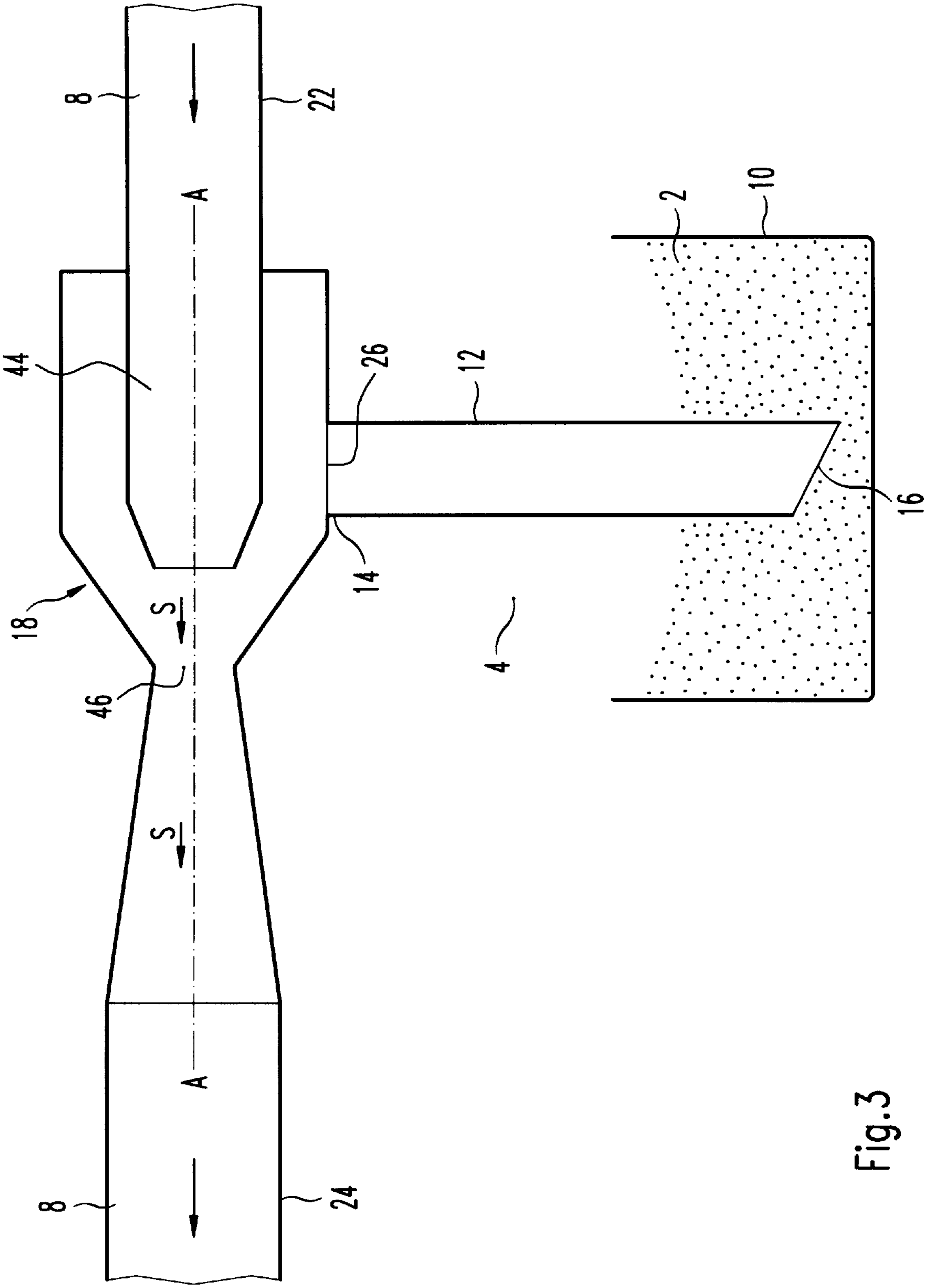
FIG. 3 is a schematic sectional view of a portion of the apparatus according to the invention.

With reference to FIG. 3, the structure of the suction/pressure injector 20 is shown in a schematic sectional view. Included are a channel-like section 18 with a constriction 46 and a nozzle 44 which extends from the overpressure input 22 into the channel-like section 18 along the longitudinal axis A. At that side of the constriction 46 facing away from the nozzle 44, the channel-like section expands along the flow direction S of the compressed air 8 toward the overpressure outlet 24. The first end 14 of the suction channel 12 discharges into the channel-like section 18 in the region upstream of the constriction 46.

When the compressed air 8 flows through the nozzle 44 and the channel-like section 18 along the flow direction S during the operation of the present apparatus, a reduced pressure that extends up to the underpressure connection 26 in the space of the channel-like section 18 which concentrically surrounds the nozzle 44 arises at the constriction 46. As a result, the powder toner 2 is extracted from the reservoir 10 through the suction channel 12 into the channel-like section 18, where it is mixed with the compressed air 8 to form a toner/compressed air mixture that leaves the channel-like section 18 at the overpressure outlet 24. The reduced pressure which arises at the constriction 46 and is essential for the suction effect is greater the more pronounced the constriction. The reduced pressure and, thus, the suction effect as well, is enhanced by increasing the flow velocity of the compressed air flowing in the direction S.

Thus, there is shown and described an apparatus for conveying finely powder toner material from a reservoir with a suction/pressure unit that extends into the reservoir. A gas is introduced and mixed in the suction/pressure unit with the finely powder material that is sucked in from the reservoir to form a mixture of powder and gas and the mixture is then discharged. A fluidizing unit blows compressed air into the reservoir as a finely dispersed emission to place the finely powder material into a fluidized condition so that, as a result, the extraction of the finely powder material from the reservoir is facilitated.

Although other modifications and changes may be suggested by those skilled in the art, it is the intention of the inventors to embody within the patent warranted hereon all changes and modifications as reasonably and properly come within the scope of their contribution to the art.

We claim:

1. An apparatus for conveying toner from a reservoir, the apparatus having an overpressure gas source, comprising:

a suction/pressure unit including:

an overpressure inlet connected to said overpressure gas source so that gas from said overpressure gas source is introduced into said overpressure inlet, an overpressure outlet, and an underpressure connection at which an underpressure is generated;

a suction channel connected to said underpressure connection, said suction channel including an end projecting into the reservoir to suction toner from said reservoir;

a fluidizing unit in the reservoir to fluidize toner in a proximity of said end of said suction channel;

an overpressure delivery line connected to said overpressure outlet; and said suction/pressure unit mixing the gas introduced at said overpressure inlet with the toner suctioned in from the reservoir to form a toner/gas mixture and the mixture being delivered through said overpressure delivery line connected to said overpressure outlet wherein said fluidizing unit includes at least one fluidizing element projecting into the reservoir with which the gas is supplied finely distributed to an interior of the reservoir, and wherein said fluidizing element projecting has a hollow space that is surrounded by a porous wall through whose pores compressed air is supplied to the interior of the reservoir.

2. An apparatus as claimed in claim 1, wherein the pores are of a diameter of is smaller than a diameter of particles of the toner.

3. An apparatus for conveying toner from a reservoir, the apparatus having an overpressure gas source, comprising:

a suction/pressure unit including:

an overpressure inlet connected to said overpressure gas source so that gas from said overpressure gas source is introduced into said overpressure inlet, an overpressure outlet, and an underpressure connection at which an underpressure is generated;

a suction channel connected to said underpressure connection, said suction channel including an end projecting into the reservoir to suction toner from said reservoir;

a fluidizing unit in the reservoir to fluidize toner in a proximity of said end of said suction channel;

an overpressure delivery line connected to said overpressure outlet; and said suction/pressure unit mixing the gas introduced at said overpressure inlet with the toner suctioned in from the reservoir to form a toner/gas mixture and the mixture being delivered through said overpressure delivery line connected to said overpressure outlet;

wherein said suction/pressure unit includes:

a channel-like section between said overpressure input and said overpressure outlet, said channel-like section having a longitudinal axis extending from said overpressure input to said overpressure outlet essentially along a flow direction of the gas, said channel-like section having a constriction perpendicular to the longitudinal axis, a nozzle projecting along said longitudinal axis from the overpressure input into an inside of said channel-like section and being directed toward the overpressure outlet, and said suction channel having a first end opposite said end projecting into the reservoir, said first end discharging into said channel-like section upstream from said constriction with reference to the flow direction of the gas.

4. An apparatus for conveying toner from a reservoir, the apparatus having an overpressure gas source, comprising:

a suction/pressure unit including:

an overpressure inlet connected to said overpressure gas source so that gas from said overpressure gas source is introduced into said overpressure inlet, an overpressure outlet, and an underpressure connection at which an underpressure is generated;

a suction channel connected to said underpressure connection, said suction channel including an end projecting into the reservoir to suction toner from said reservoir;

a fluidizing unit in the reservoir to fluidize toner in a proximity of said end of said suction channel;

an overpressure delivery line connected to said overpressure outlet;

said suction/pressure unit mixing the gas introduced at said overpressure inlet with the toner suctioned in from the reservoir to form a toner/gas mixture and the mixture being delivered through said overpressure delivery line connected to said overpressure outlet; and a distributor system connected to said overpressure delivery line, said distributor system including a plurality of compressed air conduits parallel to one another along which the toner/gas mixture is transported.

5. An apparatus as claimed in claim 4, wherein said distributor system includes at least one controllable shunt and branching so that the toner/gas mixture is controllably supplied to a destination point through said distributor system.

6. An apparatus as claimed in claim 5, further comprising:

an air separator as the destination point; and developer station of a printer or copier connected to an output of said air separator.

* * * * *